(12) United States Patent
Wangsgaard

(10) Patent No.: US 7,810,851 B2
(45) Date of Patent: Oct. 12, 2010

(54) WRENCHLESS MANIFOLD

(75) Inventor: Tres Wangsgaard, Holladay, UT (US)

(73) Assignee: Orbit Irrigation Products, Inc., Bountiful, UT (US)

( * ) Notice: Subject to any disclaimer, the term of this patent is extended or adjusted under 35 U.S.C. 154(b) by 0 days.

(21) Appl. No.: 12/128,707

(22) Filed: May 29, 2008

(65) Prior Publication Data

US 2009/0294554 A1 Dec. 3, 2009

(51) Int. Cl.
*F16L 19/025* (2006.01)

(52) U.S. Cl. .................. 285/354; 285/386; 403/22; 239/600

(58) Field of Classification Search ............ 285/247, 285/354, 359, 386, 387, 388, 389, 395; 403/22; 239/201, 207, 565, 600
See application file for complete search history.

(56) References Cited

U.S. PATENT DOCUMENTS

| | | | | |
|---|---|---|---|---|
| 227,170 | A | * | 5/1880 | Lechner .................. 285/359 |
| 744,788 | A | * | 11/1903 | Nobel et al .............. 285/330 |
| 2,433,304 | A | | 12/1947 | Stream |
| 3,083,914 | A | * | 4/1963 | Smith et al. ............. 239/203 |
| 4,630,635 | A | * | 12/1986 | Bernstein et al. ...... 137/315.07 |
| 4,927,192 | A | * | 5/1990 | Ungchusri et al. ......... 285/305 |
| 5,348,349 | A | * | 9/1994 | Sloane .................... 285/92 |
| 5,376,015 | A | * | 12/1994 | Fuchs et al. ............ 439/321 |
| 5,433,551 | A | * | 7/1995 | Gordon ................. 403/377 |
| 6,293,595 | B1 | * | 9/2001 | Marc et al. .............. 285/92 |
| 7,021,672 | B2 | | 4/2006 | Ericksen et al. |
| 7,051,763 | B2 | | 5/2006 | Heren |
| 7,216,672 | B1 | | 5/2007 | Chen |
| 7,243,684 | B1 | | 7/2007 | Chen |
| 7,314,237 | B2 | | 1/2008 | Warden |
| 2001/0013700 | A1 | | 8/2001 | Mintz et al. |
| 2002/0125716 | A1 | | 9/2002 | Rochelle |
| 2002/0163194 | A1 | | 11/2002 | Mintz et al. |
| 2004/0036292 | A1 | | 2/2004 | Austin |
| 2004/0090067 | A1 | | 5/2004 | Pridham |
| 2006/0033333 | A1 | * | 2/2006 | Pickney, Jr. .............. 285/386 |
| 2007/0052234 | A1 | * | 3/2007 | Breay .................... 285/354 |
| 2008/0012326 | A1 | * | 1/2008 | Braathen et al. .......... 285/354 |
| 2009/0160186 | A1 | * | 6/2009 | McGuire ................. 285/354 |

FOREIGN PATENT DOCUMENTS

WO  WO-2004/106794 A2  12/2004

* cited by examiner

*Primary Examiner*—James M Hewitt
(74) *Attorney, Agent, or Firm*—Austin Rapp & Hardman

(57) ABSTRACT

A sprinkler apparatus including a manifold is used with a nipple and a union. The manifold includes a pipe section and at least one port. There is a fitting on the port. The nipple has a proximal and distal end. A fitting is located at the distal end of the nipple. One or more radially extending projections may be positioned around the circumference of the nipple. The fitting on the distal end of the nipple may form a water-tight seal with a fitting on a valve without tightening with a wrench by mating projections and indentations and applying a torque to the union. The union includes one or more indentations that may align with and mate with the projections to allow the union to slide over the nipple. The union has a fitting. The fitting on the union corresponds to and engages the fitting on the port.

15 Claims, 4 Drawing Sheets

WRENCHLESS MANIFOLD

BACKGROUND OF THE INVENTION

There are many types of irrigation systems known in the art. These irrigation systems generally include irrigation devices, which may be sprinklers, drip emitters, etc. These irrigation devices will generally distribute water to an area such as a lawn, a garden, etc. so that grass and other plants may grow. Of course, in order to provide water to the irrigation devices, the irrigation devices are used with a system of arterial pipes connected to a water source. Water is generally delivered to the irrigation devices via the system of pipes. Generally, this system of irrigation devices and pipes are referred to as a "sprinkler system."

As is known in the art, most modern sprinkler systems include a "valve box" that contains one or more valves. In many conventional sprinkler systems, the individual sprinklers will be divided into "zones" or lines. Each zone of sprinklers will be attached to a separate valve. Thus, the typical sprinkler system will contain multiple valves. The valves allow the user to turn on and off a particular zone of sprinklers as desired. When the valve is closed, the valve blocks water flow. However when the valve is opened, water will flow through the piping to water a particular area/zone of the property. Thus, individual zones or areas of the yard may be watered differently—i.e., watered at different times, receive different amounts of water, etc.

Most pipes currently used in sprinkler systems are made of PVC. Accordingly, in order to attach the valve to the irrigation system, the pipe will generally have a male fitting that includes threads and the valve will have a female fitting that is designed to receive the threads. The male fitting may then be screwed into the female fitting to effectuate attachment. Of course, other systems may be designed in which the valve has the male fitting and the pipe has the female fitting, but such systems will still be connected by have the male fitting screw into the female fitting.

However, in order to ensure that the male and female fittings have a water-tight seal, generally the user will be required to tighten the fittings together using a wrench. If a wrench is not used to properly tighten the system, undesirable leaks may occur in the system, resulting in water loss, possible flooding, etc.

Unfortunately, many users do not like to use wrenches to fix their sprinkler system. These users find wrenches to be inconvenient. In fact, many users dislike wrenches because they are afraid that they will "over-tighten" the system and end up breaking the fitting. Accordingly, it would be an advantage to construct a new device that did not require the use of a wrench to create a water tight seal. Such a device is disclosed herein.

BRIEF SUMMARY OF THE INVENTION

The present embodiments relate to a manifold that may be connected to a sprinkler valve. As is known in the art, the valve may be selectively opened and closed. The manifold (either directly or through piping) is connected to the water source. Thus, water will flow from the water source into the manifold and then access the valve. If the valve is open, water will flow through the valve and access an irrigation zone, whereas if the valve is closed, the water flow to the irrigation zone will be blocked. The manifold and valve are generally positioned within a "sprinkler box" or "valve box" so that the user may access these components for repair, replacement, etc.

A nipple and a union may be used with the manifold. The nipple includes a fitting (threads) on the distal end that are designed to connect to the valve. The nipple also includes one or more projections. The union has a female fitting that is designed to engage a male fitting on the manifold. The union also includes one or more indentations. The union will then partially slide over the nipple so that the projections engage the indentations. This type of engagement provides an excellent gripping surface so that the user may then tighten the threads on the end of the nipple into a valve using his or her hands. The user will be able to tighten the nipple into the valve to form a water-tight seal without requiring the use of a wrench.

After the nipple has been secured to the valve, the indentations and the projections may be disengaged. This will allow the nipple to slide through the union so that the union's female fittings engage and connect to the male fittings on the manifold. In this manner, the manifold is ultimately connected to the valve so that water may flow therethrough.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in the Figures, is not intended to limit the scope of the invention, as claimed, but is merely representative of presently preferred embodiments of the invention.

Figure 1:
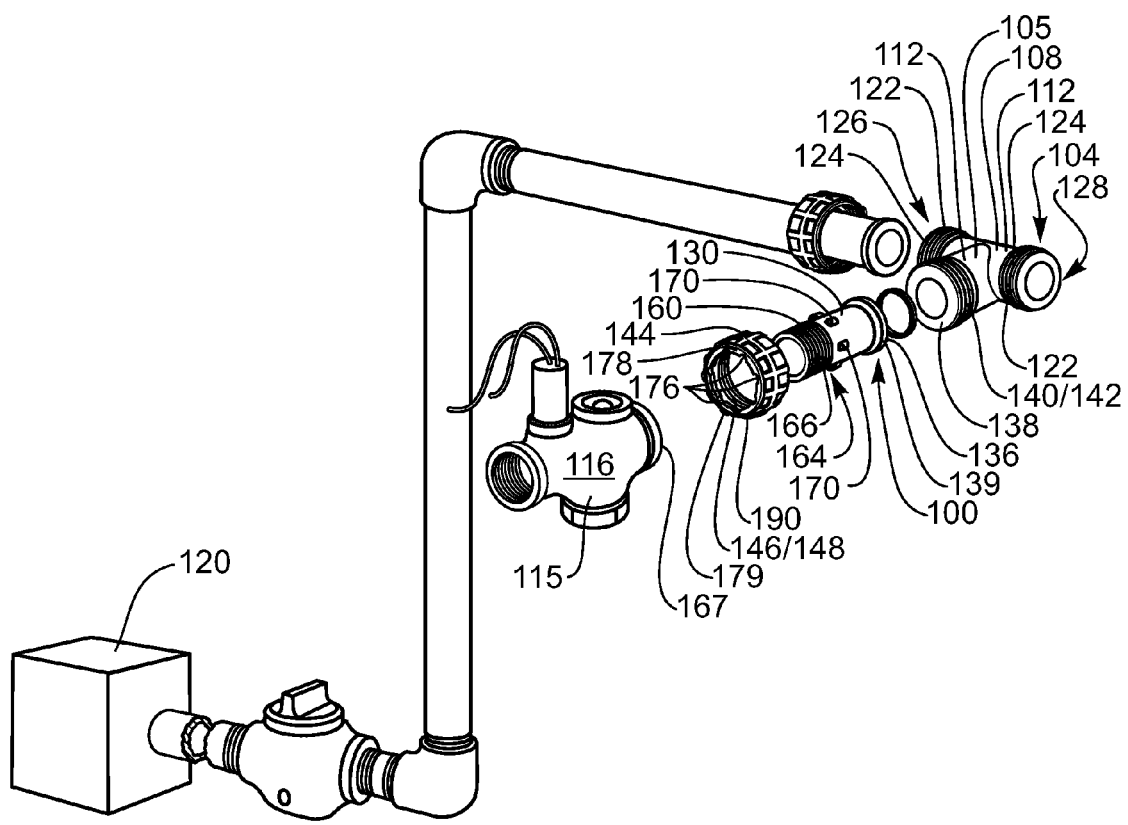
FIG. 1 is an assembly view of a sprinkler apparatus according to the present embodiments.

FIG. 1 is a partially exploded assembly view of one embodiment of a sprinkler apparatus 100 according to the present embodiments is illustrated. The sprinkler apparatus 100 is designed for use in a sprinkler system. The sprinkler apparatus 100 includes a manifold 104. The manifold 104 is a sprinkler component that contains a pipe section 108 and at least one port 112. In the embodiment shown in FIG. 1, multiple (two) ports 112 may be used. More than two ports 112 may be used. In other embodiments, the manifold 104 may only have one port 112, but be connected to one or more adjacent manifold(s) 104 having additions port(s). Thus, a skilled artisan could construct embodiments in which any number of ports 112 are used.

As is described in greater detail herein, the manifold 104 may be used in conjunction with a sprinkler component 115, which may be sprinkler valve 116 or any other type of sprinkler component such as a sprinkler head, a drain, etc. The valve 116 may be a solenoid unit or other device that can open to allow water to pass through the pipes. The valve 116 can also close to prevent the flow of water. The valve 116 may be connected to an electric timer (or controller) that will automatically open and close the valve at pre-selected times. Thus, the owner can use the combination of the valve 116 and timer to irrigate while the owner is on vacation, away from home or asleep, to water automatically during day-time or night-time hours, to automatically water at set intervals (such as every three days), etc. The use of such valves/timers is well known and such devices are incorporated into almost all conventional sprinkler systems. Of course, in other embodiments, the component 115 may be different than the valve 116, but may be a pipe, pipe section, or other type of component commonly used in a sprinkler system.

Each port 112 may be connected to a separate valve. Generally, the multiple valves 112 will be grouped together in a "sprinkler box" (not shown) that is placed in the ground. The sprinkler box allows the valves 116 to be buried under the ground and hidden from sight, and also allows the valves 116 to be protected from any accidental damage that may occur if they were placed above ground. At the same time, the placement of the valves 116 in a sprinkler box allows the user access to all of these devices at the same time without requiring the user to go to different locations. The user may desire to access the valves 116 for routine maintenance of the sprinkler system, to fix leaks, etc.

As shown in FIG. 1, the manifold 104 may be connected (either directly or through piping) to a water source 120 that is capable of supplying water to the sprinkler system. Those skilled in the art will appreciate how this may be accomplished. For example, the pipe section 108 of the manifold 104 may include at least one fitting 122 that allows the manifold 104 to be connected to other piping and/or sprinkler components. As shown in the embodiment of FIG. 1, the fitting 122 may be positioned at both the proximal end 126 and the distal end 128. The fitting 122 may be threads 124. As shown in FIG. 1, the threads 124 are "male threads" that are designed to fit into female threads on corresponding piping or sprinkler components. Of course, other embodiments may be made in which the fitting 122 comprises female threads or other types of connection mechanisms that are capable of connecting sprinkler pipe and/or sprinkler components together. In further embodiments, the fitting 122 may simply comprise a joint into which pipe may be inserted and cemented as a means for connecting the manifold 104 to other piping/sprinkler components.

The present apparatus 100 also includes a nipple 130. The nipple 130 is designed such that it may be positioned and attached to a port 112. To this end, the port 112 has a flat end 138. The nipple 130 will include a shoulder 136. The flat end 138 will engage/abut the shoulder 136. The shoulder 136 is positioned at the proximal end 139 of the nipple 130.

In addition to the flat end, the port 112 will include a fitting 140 (which is sometimes called a "first fitting"). The fitting 140 is designed to allow the port 112 to connect to other components, so that the port 112 may ultimately be used in conjunction with the valve 116. In the embodiment of FIG. 1, the fitting 140 comprises male threads 142.

The nipple 130 may be used in conjunction with a union 144. The union 144 may be circular and may be designed to slide over the nipple 130. In other words, the nipple 130 may pass through the union 144. The union 144 also includes a fitting 146 (which is sometimes called a "fourth fitting") that is designed to engage the fitting 140. In other words, at least a portion of the fitting 146 may be female threads 148 that are designed to engage the male threads 142 on the port 112.

The nipple 130 may further include a fitting 160 (which is sometimes called a "second fitting") that is positioned at a distal end 164. This fitting 160 may be threads 166 (such as male threads). The fitting 160 is designed to be secured to a corresponding fitting 167 (which is sometimes called a "third fitting") on the valve 116, thereby securing the nipple 130 to the valve 116, thereby forming a water-tight seal.

As shown in FIG. 1, the nipple 130 includes one or more projections 170. The projections 170 extend radially outward. The projections 170 may be distributed (or equally distributed) around the circumference of the nipple 130. The union 144 includes a collar 190 that includes one or more indentations 176 that are designed to engage and mate with the projections 170. The number of indentations 176 corresponds to the number of projections 170 and the locations of the indentations 176 align with the locations of the projections 170. Generally, when the nipple 130 is positioned such that the position of the projections 170 aligns with the indentations 176, the nipple 130 will pass through the union 144. However, if the position of projections 170 does not align with the position of the union 144 (i.e., the union 144 or the nipple 130 rotates out of alignment), the projections 170 will contact the collar 190 of the union 144 such that the nipple 130 cannot pass through the union 144.

In some embodiments, the union 144 comprises a lip 178 and a shoulder 179. The lip 178 is added to the shoulder 179. The depth of the indentations 176 is less than the depth of the lip 178.

Figure 2A:
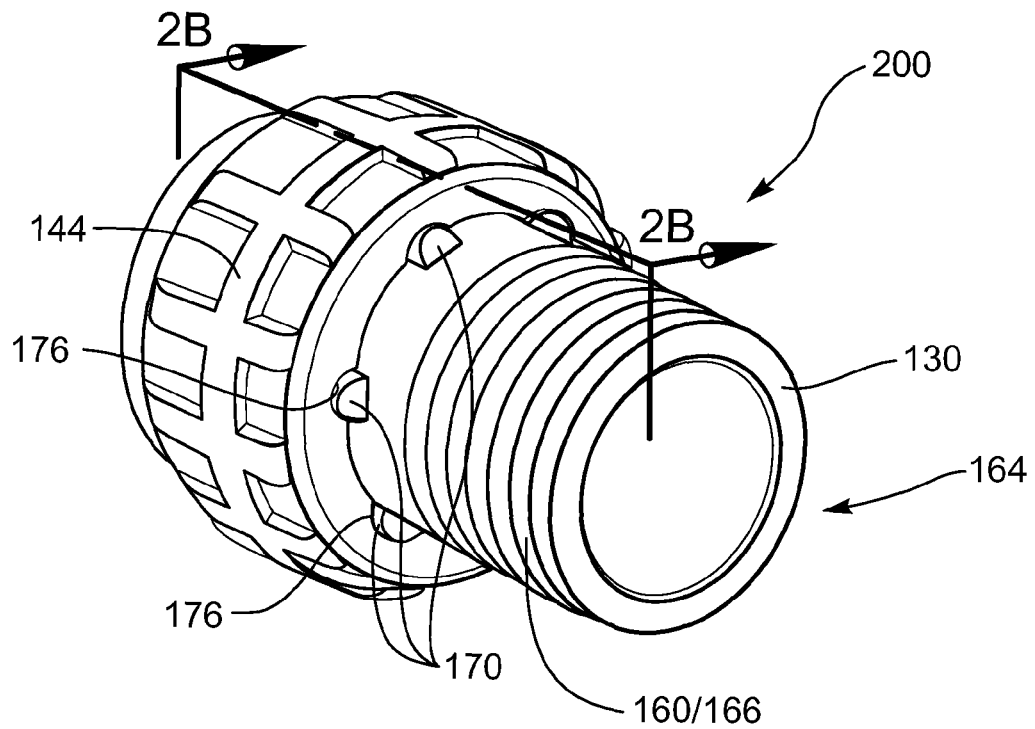
FIG. 2A is an assembly view of a nipple and a union that is used in the apparatus of FIG. 1, wherein the nipple has been partially slid through the union.
Figure 2B:
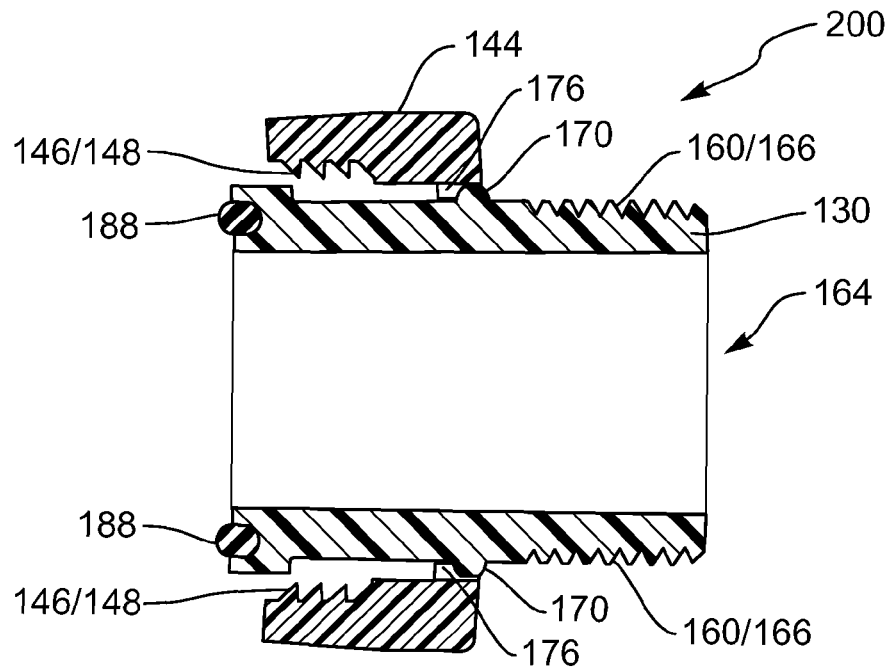
FIG. 2B is a cross-sectional view of the embodiment of FIG. 2A along line 2B-2B.
Figure 2C:
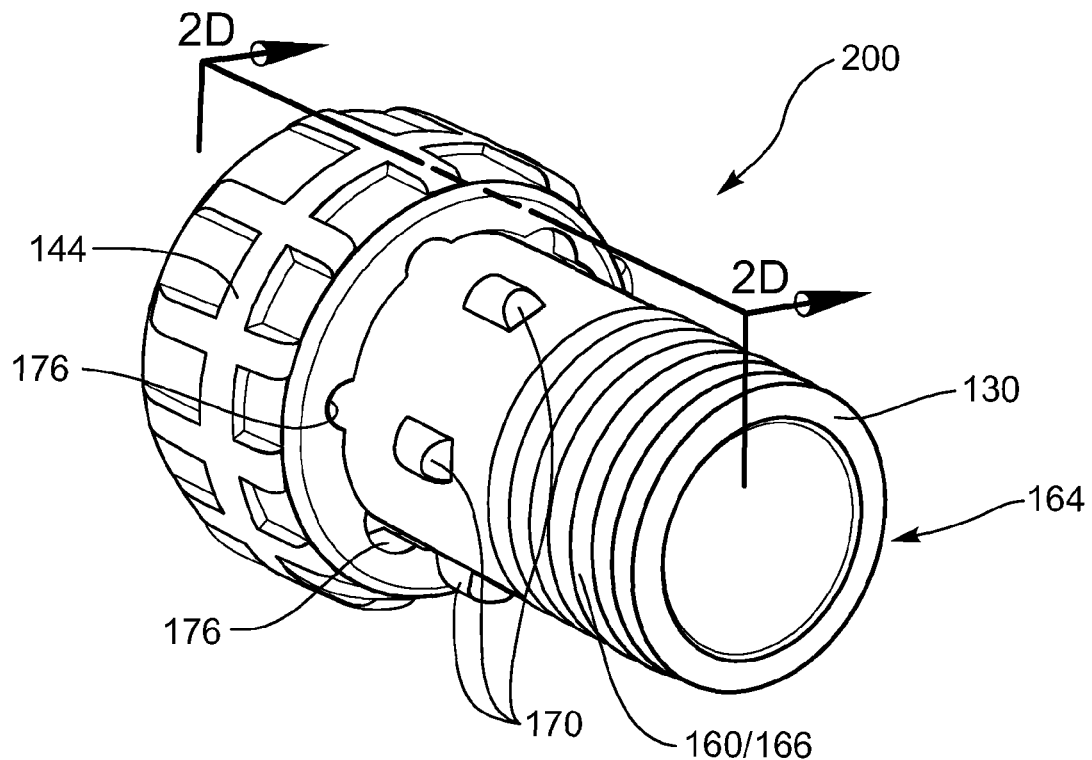
FIG. 2C is an assembly view of a nipple and a union that is used in the apparatus of FIG. 1, wherein the nipple has been fully slid through the union.
Figure 2D:
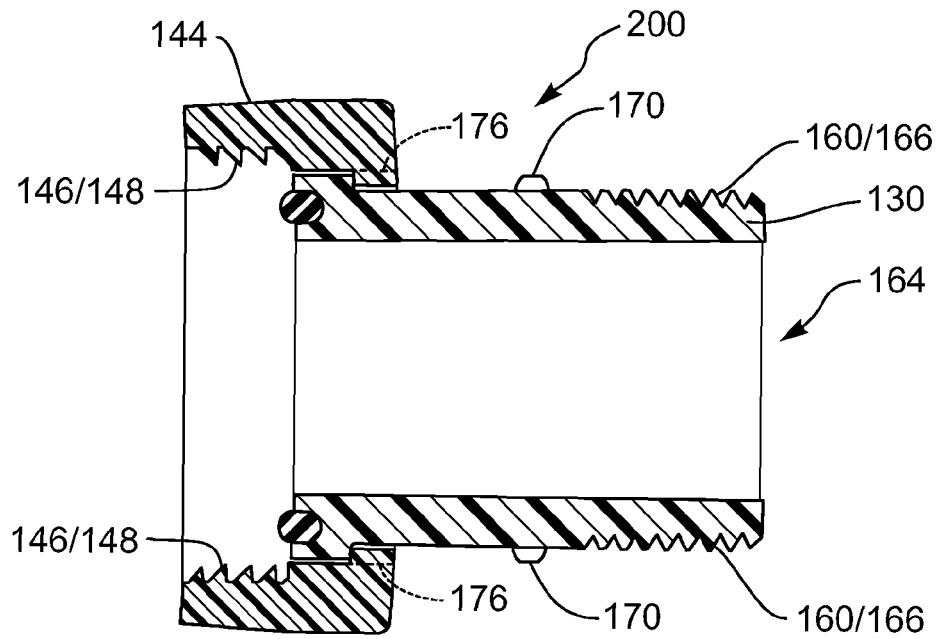
FIG. 2D is a cross-sectional view of the embodiment of FIG. 2C along line 2D-2D.

FIGS. 2A through 2D show the correlation and engagement between the indentations 176 and the projections 170. Specifically, FIGS. 2A and 2B show the apparatus when the nipple 130 has been partially slid through the union 144. FIGS. 2C and 2D show the apparatus when the nipple 130 has been fully slid through the union 144.

When the nipple 130 is partially slid through the union 144 (as shown in FIGS. 2A-2B), the projections 170 engage the indentations 176. This engagement allows a user to grip this two-piece configuration and produce sufficient torque such that s/he can tighten the fitting 160 into the sprinkler component 115/valve 116 (shown in FIG. 1) to form a water-tight seal without the use of a wrench. Rather, the user can simply "hand-tighten" the fittings together.

After this fitting 160 has been hand-tightened, the nipple 130 may be fully slid through the union 144 (as shown in FIGS. 2C-2D). When the nipple 130 is fully slid through the union 144, the indentations 176 will no longer contact the projections 170. In other words, the projections 170 are sufficiently spaced from the shoulder 136 such that when the union 144 is fully slid over the nipple 130, the indentations 176 will avoid contact with the projections 170. This allows the union 144 and the fitting 146 to attach to the manifold 104.

Again, this fitting may be hand-tightened to form a water-tight seal, or may be tightened with a wrench.

It should be noted that FIGS. 2A through 2D represent generally an adapter 200. This adapter 200 is designed to connect a first sprinkler component 115 (shown in FIG. 1) to a second sprinkler component 105 (shown in FIG. 1). In the embodiment of FIG. 1, the component 104 is a manifold and the component 115 is a valve 116, but other types of components may also be used. The adapter 200 comprises the nipple 130 and the union 144. As explained herein, when these components are used together, the sprinkler components 115 and 105 may be attached together, even when the fittings associated with the components 115/105 may not be directly attachable (i.e., they are both female threads, the threads are of different sizes, etc.).

Figure 3:
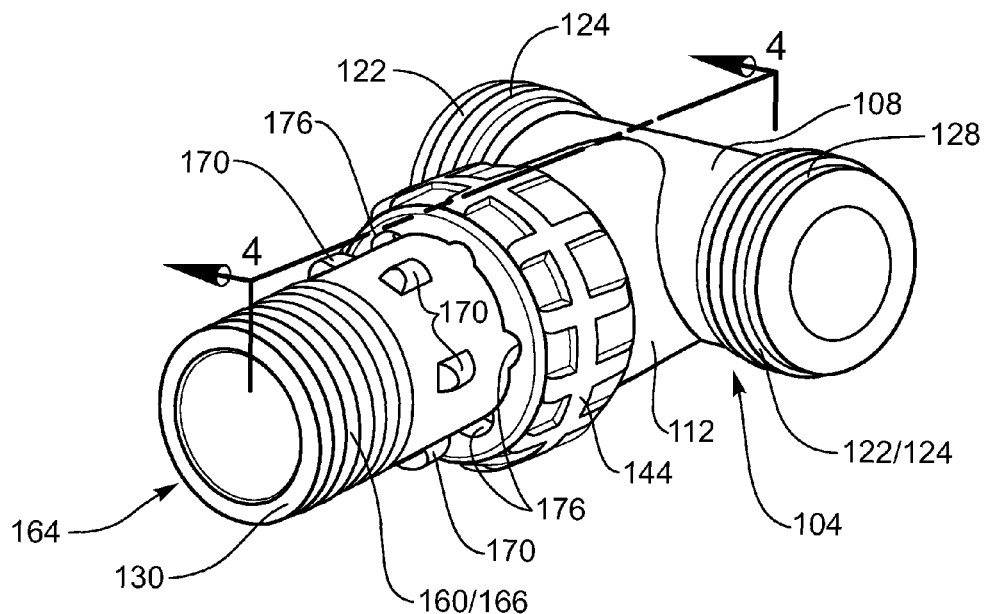
FIG. 3 is a perspective view of the manifold portion of the embodiment of FIG. 1 after this portion has been fully assembled.

While FIG. 1 is an assembly view of the apparatus 100, FIG. 3 shows the apparatus after it has been fully assembled. Accordingly, referring collectively to FIGS. 1, 2A, 2B, 2C, 2D, and 3, the assembly of the apparatus 100 will now be shown and described. The union 144 will be slid over the nipple 130. Of course, in order to slide the nipple 130 through the union 144, the projections 170 must be aligned first to mate/correspond to the indentations 176. Once this alignment has occurred, the union 144 is slid such that it covers the proximal end 139 of the nipple 130.

Once the union 144 has been properly positioned, the fitting 160 at the distal end 164 of the nipple 130 is connected to the valve 116. As explained above, the fitting 160 comprises threads 166 that engage corresponding threads in the valve 116. The fitting 160 may be hand-tightened to the valve 116 and creates a water-tight seal, thereby eliminating the need to tighten this connection with a wrench. When assembled, the nipple 130 (with the projections 170) and the union 144 (with the indentations 176) create a larger gripping surface for the user and can impart a greater amount of torque. Accordingly, using this larger gripping surface and larger torque, the user can tighten the fitting 160 into the valve 116 without using a wrench.

Once the valve 116 has been attached, the fitting 146 on the union 144 may then be attached to and tightened (either without a wrench or using a wrench, if necessary) to the fitting 140 on the port 112. In other words, the male threads 142 on the port 112 are connected and tightened to the female threads 148 on the union 144. Once these fittings 140, 146 have been engaged, the valve 116 is connected to the manifold 104. (Of course, other embodiments may be designed in which the union 144 is secured to the port 112 before the valve 116 is attached to the nipple 130.)

Figure 4:
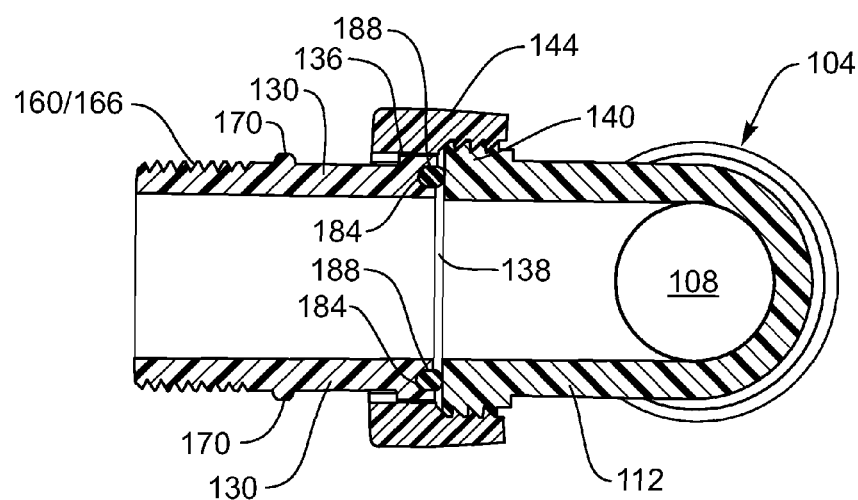
FIG. 4 is a cross-sectional view taken along the line 4-4 of FIG. 3.

FIG. 4 is a cross-sectional view of the assembled apparatus 100 taken along the line 4-4 of FIG. 3. For purposes of clarity, only the nipple 130 and the union 144 are illustrated. As can be seen in FIG. 4, the flat end 136 of the nipple 130 may include a groove 184 that receives an O-ring 188. The O-ring 188 is designed to seal the joint between the union 144 and the nipple 130. In the embodiment of FIG. 4, the O-ring 188 has an "oblong" cross-section. This means that the cross-sectional profile of the O-ring 188 is oval or elliptical rather than round. By having this oblong O-ring 188, there is additional friction on the surface of the O-ring 188 that operates to better retain the O-ring 188 in the groove 184, and thus creating a better seal between the nipple 130 and the union 144. Of course, other embodiments may be designed in which an O-ring with a circular or round cross-sectional profile may be used.

It should be noted that the protrusions 170 may or may not have a slight interference fit during assembly with the indentations 176 such that the union 144 is retained unless a force is actively applied to remove the union 144 from the nipple 130. In other words, the union indentations 176 "pop over" the nipple protrusions 170 such that the union is retained during shipping, packaging, and the union 144 only comes off the nipple 130 when a force is actively applied to remove it.

Referring now to all of the Figures, the present embodiments also relate to a method for installing a nipple 130 without a wrench, the method comprising the steps of partially sliding the nipple 130 through a union 144. The union 144 comprises indentations 176. The nipple 130 comprises a fitting 160 on its distal end 164 and projections 170 that correspond to the indentations 176. The projections 170 are aligned with the indentations 176 to form an engagement therebetween. The method also includes the step of applying torque to form a water-tight attachment between the fitting 160 on the nipple 130 and a sprinkler component 115 without the use of a wrench. In other words, by gripping the union 144 (and the engagement of the projections 176 with the indentations 170), the user can apply sufficient torque to the system to create a water tight seal, without twisting the system with a wrench. The method further includes the step of advancing the union 144 to disengage the projections 170 with the indentations 176, such advancement causing a shoulder 136 on the nipple 130 to engage the union 144. (In other words, the nipple 130 is fully slid through the union 144, ending the engagement between the indentations 176 and the projections 170). Finally, the method includes the step of rotating the union 144 to secure the union to a manifold 104.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A sprinkler apparatus comprising:
   a manifold having a pipe section and at least one port, the port having a first fitting;
   a nipple having a second fitting at a distal end and one or more radially extending projections,
   a union comprising one or more indentations corresponding to the projections, wherein, when the indentations correspond to the projections, the second fitting on the distal end of the nipple may engage with a third fitting on a sprinkler component and form a water-tight seal without tightening with a wrench, the union further comprising a fourth fitting, wherein the union may fully slide over the nipple so that the fourth fitting may engage the first fitting on the port.

2. The apparatus of claim 1 wherein the manifold has multiple ports.

3. The apparatus of claim 1 wherein the sprinkler component is a valve.

4. The apparatus of claim 1 wherein the projections are spaced around a circumference of the nipple and the indentations are correspondingly spaced around a circumference of the union.

5. The apparatus of claim 4 wherein the projections are equally spaced around the circumference of the nipple.

6. The apparatus of claim 1 wherein the nipple comprises a shoulder for engaging a corresponding flat edge on the port.

7. The apparatus of claim 1 wherein the nipple further comprises a groove that receives an O-ring, wherein the O-ring is oblong in cross-section.

8. The apparatus of claim 1 wherein the nipple comprises a shoulder, the projections being sufficiently spaced from the shoulder such that when the union is fully slid over the nipple, the indentations will avoid contact with the projections.

9. The apparatus of claim 1 wherein the pipe section has a fitting on both its proximal and distal end.

10. The apparatus of claim 1 wherein the union comprises a shoulder with a lip, a depth of the indentations being less than the depth of the lip.

11. A method for installing the nipple of claim 1 without a wrench using the sprinkler apparatus of claim 1, the method comprising:
   partially sliding the nipple through the union such that the indentations of the union engage the projections of the nipple;
   applying torque to the union to form a water-tight attachment between the second fitting of the nipple and the third fitting of the sprinkler component without the use of a wrench; and
   advancing the union to disengage the projections from the indentations, such advancement causing a shoulder on the nipple to engage the union.

12. The method of claim 11 further comprising a step of rotating the union to secure the union to the manifold.

13. An adapter for connecting a first sprinkler component and a second sprinkler component, the first and second sprinkler components each having a fitting that may not be directly connected, the adapter comprising:
   a union comprising one or more indentations and a fitting; and
   a nipple comprising one or more radially extending projections and a fitting at a distal end, the one or more indentations of the union corresponding to the one or more radially extending projections of the nipple, wherein when the indentations engage the projections, a user may tighten the fitting on the nipple to the fitting on the first component without use of a wrench, and wherein, the union may then be fully slid over the nipple by disengaging the indentations from the projections so that the fitting on the union may engage the fitting on the second component.

14. The adapter of claim 13 wherein the projections are equally spaced around a circumference of the nipple.

15. The adapter of claim 13 wherein the nipple further comprises a groove that receives an O-ring, wherein the O-ring is oblong in cross-section.

* * * * *